Oct. 15, 1929.  H. HACKMAN  1,732,013
TWO-CYCLE GAS ENGINE
Filed Dec. 2, 1926
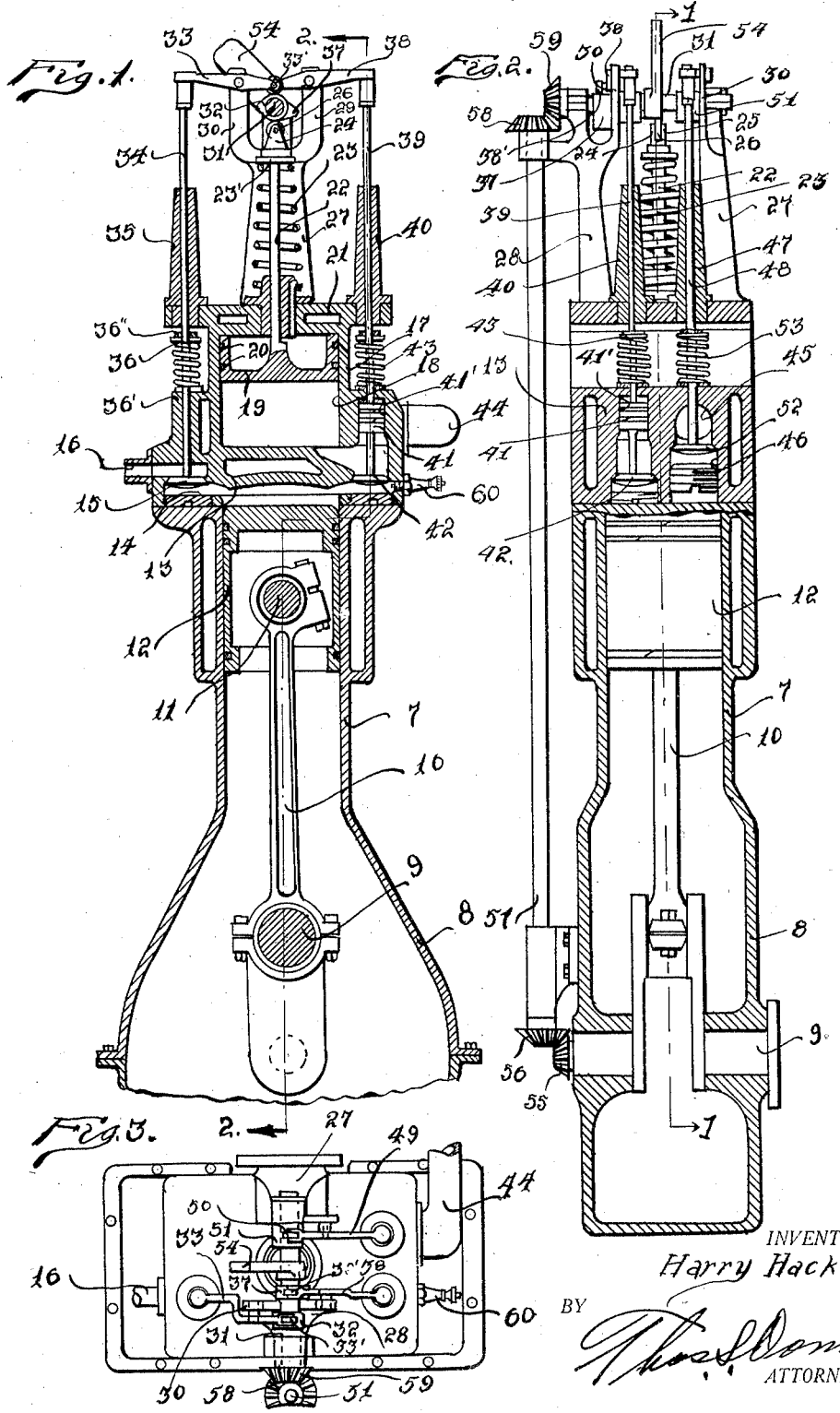
INVENTOR.
Harry Hackman
BY
ATTORNEY.

Patented Oct. 15, 1929

1,732,013

UNITED STATES PATENT OFFICE

HARRY HACKMAN, OF DETROIT, MICHIGAN

TWO-CYCLE GAS ENGINE

Application filed December 2, 1926. Serial No. 152,084.

My invention relates to a new and useful improvement in a two cycle gas engine, and has for its object the provision of a gas engine which will be highly efficient in operation, and in which the lost motion of the gas engine may be reduced to a minimum.

Another object of the invention is the provision of a two cycle gas engine which will be simple in structure and durable in use.

Another object of the invention is the provision in a gas engine of this type of a compressing cylinder and provided with mechanical means for operating said compressing cylinder at predetermined positions of operation of the engine.

Another object of the invention is the provision of a control valve for controlling the inlet of the compressed gases into the combustion chamber, so that the same may be delivered to the combustion chamber in predetermined degrees of compression at predetermined intervals.

Other objects will appear hereinafter.

The invention consists in the combination and arrangement of parts hereinafter described and claimed.

The invention will be best understood by a reference to the accompanying drawings which form a part of this specification and in which Fig. 1 is a fragmentary sectional view of an engine embodying the invention taken on substantially line 1—1 of Fig. 2.

Fig. 2 is a sectional view of the invention taken on substantially line 2—2 of Fig. 1.

Fig. 3 is a top plan view of the invention.

The invention may be mounted upon the standard type of gasoline engine, the head being separable from the cylinder block. In the drawings I have illustrated an internal combustion engine embodying the principles of my invention in which there is a cylinder 7, a crank case 8 and a crank shaft 9, the crank shaft being connected by the connecting rod 10 to the wrist pin 11 which is attached to the piston 12 which is reciprocally mounted in the cylinder 7. Positioned above the cylinder 7 is a head 13 forming with the upper surface of the cylinder block a passage 14 whereby the exhaust gases may be discharged when the valve 15 is moved from its seat, a suitable conduit 16 being provided for carrying the exhausted gases away. The head proper 17 is provided with a cylinder 18 in which is slidably mounted the piston 19 having the sealing rings 20 formed thereon. A cover 21 is positioned above the cylinder 18, and projected through this cover 21 is the piston rod 22 which connects to the piston 19. Embracing the piston rod 22 and engaging at one end the cover 21 is a coil spring 23, the other end engaging a washer 23' on the piston rod 22. Projecting from the upper end of the piston rod 22 are lugs 24 and 25, between which is rotatably mounted a roller 26. Projecting upwardly from the cover 21 are supporting standards 27 and 28, these supporting standards being provided with bifurcations or supporting arms 29 and 30 and serving to support the cam shaft 31. Mounted upon the cam shaft 31 is a cam 32 adapted to engage a roller 33' mounted on one end of the lever 33 which is rockingly supported on the arm 30. The opposite end of the lever 33 is connected to the valve stem 34 which projects through the guide 35 and carries the valve 15. A spring 36 is mounted on the valve stem 34 and engages at one end a projection 36', and at the other end a washer 36'' which is mounted on the valve stem 34, so as to normally retain the valve 15 in closing position. Rockingly mounted on the arm 29 is a lever 38, one end of which is provided with a roller 38' adapted to engage the cam 37 which is fixedly mounted upon the cam shaft 31. The opposite end of the lever 38 is connected to the valve stem 39 which passes through the guide 40 and carries the piston 41 which is slidably mounted in the pocket 41'. Mounted on the stem 39 is the valve head 42. A spring 43 is mounted on the valve stem 39 in embracing relation and serves to normally retain the valve head 42 in engagement with its seat. A manifold 44 is provided for delivering the gas to the interior of the cylinder 18, this manifold communicating through the opening 45 and the passage 46 with the interior of the cylinder 18. Projecting from the cover 21 and through the guide 47 is a valve stem 48 which is connected at its upper end to one end of the rockingly mounted lever 49 carried by the standard 27, the other end of which is provided with the roller 50 engaging the cam 51 which is mounted upon the cam shaft 31. A valve head 52 is carried by the stem 48 so as to open and close communication between the passage 45 and the passage 46, a spring 53 serving normally to retain this valve in closed position. Fixedly mounted on the cam shaft 31 is a large cam 54 adapted, upon rotation of the cam shaft 31, to engage the roller 26, and move the cylinder 18 downwardly in the piston 19.

The crank shaft 9 is provided with a bevel gear 55 meshing with a bevel gear 56 mounted fixedly on the shaft 51, this shaft carrying the bevel gear 58 meshing with the bevel gear 59 fixedly mounted on the cam shaft 31.

In operation, when the crank shaft is rotated the cam shaft will be rotated also through the operation of the bevel gears. The arrangement of the cams is such that as the piston 12 moves upwardly in the cylinder 7 the exhaust port will be open by the valve 15 being moved from its seat through the engagement of the cam 32 with the roller 33'. As the cylinder moves to a position closely approaching its limit of upward movement so that scavenging of the exhaust gases shall have been quite complete, the valve 15 moves to its closed position in response to the tension of the spring 36. At the same time, the valve 52 opens to admit gas to the cylinder 18. Succeeding this movement, the valve 52 moves to closed position, and the cam 54 engages the roller 26 to move the cylinder 19 downwardly. As this cylinder moves downwardly closely approaching the lowermost position of its movement, the valve 42 through the operation of the lever 38 and the cam 37 will open to admit the gas which is compressed into the combustion chamber, the piston 41' being provided to prevent leakage of the gases around the valve stem 39 when the gases are under compressed condition. Then this movement has been completed, the valve 42 again moves to closed position, after which the firing by means of the spark plug 60 takes place. The operation is then completed.

It will be noted that I have provided a novel method of admitting the gases into the combustion chamber, employing with the combustion chamber a compression chamber which is the cylinder 18, and that the admission of the gases from the compression chamber to the combustion chamber are also controlled to permit this admission at periodic times.

The invention constructed in this manner is one which provides a highly efficient internal combustion engine, and at the same time, one which is easily and cheaply manufactured, so arranged as to be practically operative at all times, with a minimum amount of repair.

While I have illustrated and described the preferred form of construction, I do not wish to limit myself to the precise form of structure shown, but desire to avail myself of such variations and modifications as may come within the scope of the appended claims.

Having thus described my invention what I claim as new and desire to secure by Letters Patent is:

1. A device of the class described comprising: a cylinder bearing head; a piston slidably mounted in said head; resilient means exterior of said head for normally retaining said piston at one position; a cam for moving said piston from said position; said head having an outlet port formed therein; a valve for closing said outlet port; resilient means for normally retaining said valve in closed position; a cam for opening said valve, said cam being operable at predetermined positions of movement of said piston; said head having an inlet port formed therein; a valve for closing said inlet port; resilient means for normally retaining said valve in closed position; a cam for opening said valve, said cam being operable at predetermined positions of said piston; said head having an exhaust port formed therein; a valve for closing said exhaust port; resilient means for normally retaining said valve in closed position; and cam operated means for opening said valve at predetermined positions of said piston.

2. In a two cycle gas engine of the class described, having a cylinder and a crank shaft, and provided with a piston in said cylinder reciprocated through connections with said crank shaft; a head mounted over said cylinder; a cylinder formed in said head; a piston slidably mounted in said head cylinder; an intake manifold communicating with a passage in said head, said passage communicating with said head cylinder; a control valve for controlling communication of said passage with said head cylinder, said head cylinder having an outlet opening adapted for communication with the cylinder of said engine; a control valve for controlling communication of said head cylinder with said engine cylinder; a cam shaft; mechanism driven by said crank shaft for rotating said cam shaft; cam operated means for moving said control valves to open position at predetermined positions of rotation of said cam shaft; a cam on said cam shaft for moving said piston in said head cylinder downwardly at predetermined positions of rotation thereof; and resilient means for normally retaining said piston in said head cylinder elevated therein.

3. In a two cycle gas engine of the class described: a cylinder; a crank shaft; a piston slidably mounted in said cylinder and connected to said crank shaft; a head mounted over said cylinder; a cylinder formed in said head in axial alignment with said first mentioned cylinder; a piston slidably mounted in said head cylinder; an intake manifold communicating with a passage in said head, said passage communicating with said head cylinder; a control valve for controlling communication of said passage with said head cylinder, said head cylinder having a lateral outlet opening formed adjacent its base for communicating with said first mentioned cylinder; and a control valve for controlling communication of said head cylinder with said first mentioned cylinder.

4. In a two cycle gas engine of the class described: a cylinder; a crank shaft; a piston slidably mounted in said cylinder and connected to said crank shaft; a head mounted over said cylinder; a cylinder formed in said head in axial alignment with said first mentioned cylinder; a piston slidably mounted in said head cylinder; an intake manifold communicating with a passage in said head, said passage communicating with said head cylinder; a control valve for controlling communication of said passage with said head cylinder, said head cylinder having a lateral outlet opening formed adjacent its base for communicating with said first mentioned cylinder; a control valve for controlling communication of said head cylinder with said first mentioned cylinder; a rod on said last named control valve projecting outwardly through said head; and a piston carried by said rod and slidable in a recess formed in said head.

5. In a two cycle gas engine of the class described: a cylinder; a head mounted on said cylinder; a cylinder formed in said head in axial alignment with said first mentioned cylinder and communicating therewith through a lateral opening formed in its base, the base of said head cylinder forming the upper end and serving as a closure for said first mentioned cylinder; and a control valve for controlling communication of said cylinders.

In testimony whereof I have signed the foregoing specification.

HARRY HACKMAN.